United States Patent [19]

Schnell

[11] Patent Number: 4,602,402
[45] Date of Patent: Jul. 29, 1986

[54] MACHINE FOR STUFFING PASTY SUBSTANCES, PARTICULARLY SAUSAGE MEAT WITH BURST CASING SENSOR

[76] Inventor: Karl Schnell, Muhlstrasse 28, 7065 Winterbach, Fed. Rep. of Germany

[21] Appl. No.: 593,601

[22] Filed: Mar. 26, 1984

[30] Foreign Application Priority Data

Mar. 30, 1983 [DE] Fed. Rep. of Germany ....... 3311567

[51] Int. Cl.$^4$ ............................................. A22C 11/02
[52] U.S. Cl. ............................................. 17/33; 17/35
[58] Field of Search ................. 17/53, 34, 35, 49, 1 R;
53/576, 505; 141/83, 67, 256, 257, 114, 94, 258,
260, 10; 221/17; 340/568, 670, 676, 540

[56] References Cited

U.S. PATENT DOCUMENTS

| 3,317,950 | 5/1967 | Ziolko ................................... | 17/35 |
| 3,545,038 | 12/1970 | Myles et al. ........................ | 17/35 |
| 3,739,276 | 6/1973 | Dornberger ......................... | 340/670 |
| 4,017,941 | 4/1977 | Raudys et al. ..................... | 17/49 |
| 4,257,146 | 3/1981 | Karp .................................... | 17/49 |

Primary Examiner—Frank T. Yost
Assistant Examiner—Hien H. Phan
Attorney, Agent, or Firm—McGlew and Tuttle

[57] ABSTRACT

In a sausage stuffing machine if the stuffed portion of a sausage casing bursts, for example in an area which is squeezed for forming a sausage end, the meat filling continues being discharged through a filling tube but is no longer capable of pulling off the gathered-up casing from the filling tube. With the further run of the pump, the sausage meat is spilled. By keeping the gathered-up casing, by means of an advance mechanism, compressed into a "block" and displacing it toward the mouth of the filling tube or toward a braking ring, proportionally to the stuffing of the casing, this advance can be transmitted through a motion transformer, to a pulse generator by which, with a constant advance, pulses are delivered at constant intervals. The pulses are received by a counter which is connectd to at least the drive of a feed pump for the sausage meat. If the casing bursts, the pulse generator stops and no pulses reach the counter. The absence of pulses makes the counter cause an interruption of the power supply to the pump drive.

12 Claims, 1 Drawing Figure

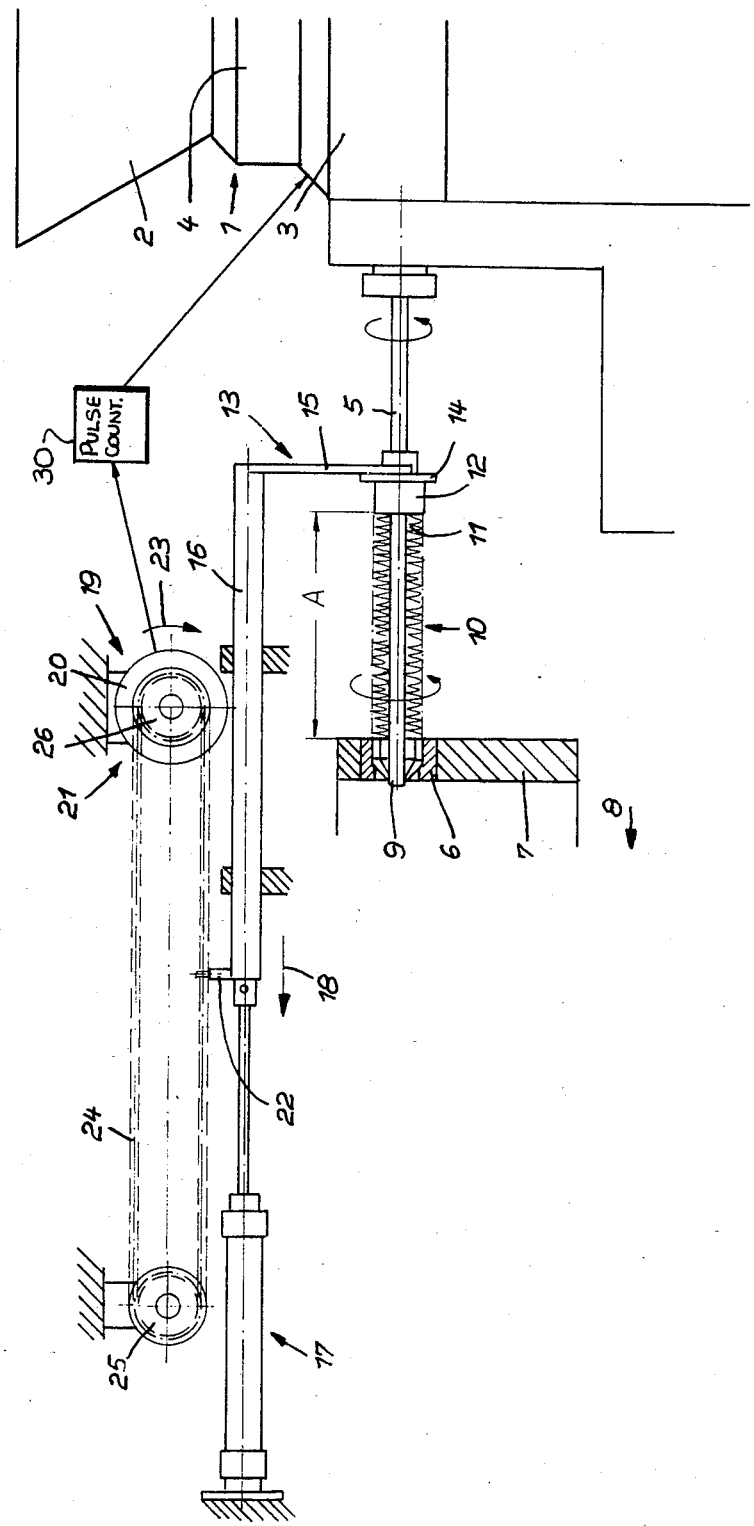

MACHINE FOR STUFFING PASTY SUBSTANCES, PARTICULARLY SAUSAGE MEAT WITH BURST CASING SENSOR

FIELD AND BACKGROUND OF THE INVENTION

The present invention relates in general to sausage casing stuffing equipment, and in particular to a new and useful device for stuffing the substance into a casing with means for stopping the stuffing operation when the casing bursts.

Stuffing machines are known per se and are widely employed. They are very efficient and automated, at least to a large extent. Such machines have already been equipped with mechanisms for engaging gathered up sausage casings, animal intestines or the like, so that the process of sausage making need only be interrupted shortly when a new gathered-up casing is engaged on the filling tube. This kind of sausage stuffing machine is mostly further combined with a device for twisting off the sausages, thus forming the sausage ends. Preferably, the pump for filling the gathered-up sausage casing in such a machine and forcing it through a braking ring operates without interruption and at locations where sausage ends are to be formed, the product is squeezed during its advance by means of a squeezing device which moves along with the product. The ends are properly formed by continuously rotating the filling tube.

At the location of squeezing, the advancing stuffed sausage string is stopped, yet the sausage portion between this location and the mouth of the filling tube continues rotating with the tube, so that two adjacent sausage ends are formed. All this is done very fast. Depending on the strength of the casing, etc., and also on the consistency of the pasty filling, it may occur that the load during the end formation becomes excessive and the casing bursts. The pump, however, which is usually of high capacity, continues operating and it may happen that a great amount of filling, in this case sausage meat, is spilled and lost. Damage may thus be done both to the equipment and by losing valuable material, particularly if, in a large meat processing plant, a plurality of machines are attended by a single operator so that the operation cannot be watched continuously.

SUMMARY OF THE INVENTION

The present invention is directed to a device which avoids, at least to a large extent, damage from burst sausage casings, etc. The invention can be used for any pasty substance however, and is not limited to sausage meat.

An object of the present invention is thus to provide a device for stuffing pasty material into a casing which is gathered on a filling tube, the filling tube being connected to a pump for pumping the pasty material through the tube and out a mouth of the tube which cooperates with a braking ring to dispense casing from one end of the gathered casing to form a sausage, with an improvement in the device comprising a driven advance mechanism which acts on a rear end of a gathered-up casing and is connected to a device for monitoring the advancing movement of the casing on the filling tube, a monitoring device connected to the advance device and also connected to a switching mechanism for the pump to stop the operation of the pump when the advance mechanism is sensed to have stopped.

The advance mechanism which acts on the rear end of the gathered-up casing considered in the advance or filling direction, serves two purposes. First, it prevents the gathered-up casing from being pulled apart on the filling tube, thus forces it to remain gathered-up, until its last portion is advanced. Second, the advance mechanism is a kind of sensor for the advancing motion of the gathered casing (this term of gathered casing will be used for convenience in the following, no limitation being thereby introduced). This sensing of the advance motion results in a linear movement of the advance mechanism, which can be detected at a suitable location and converted into a corresponding signal. In the absence of this linear movement, the derived signal is also absent. This is then utilized, in accordance with the invention, for instantly stopping the pump. Thus, in the event a stuffed portion of the casing bursts, so that the remaining gathered casing portion is no longer pulled forward, the pump is instantly stopped so that no further sausage meat is delivered. The device for monitoring the advance of the advance mechanism is connected, preferably electrically, to a switch-off mechanism of the pump, so that a signal is delivered, without delay, for stopping the pump. This makes it possible to eliminate almost to 100% any undesirable loss of sausage meat upon a rupture of the casing. A few grams may escape at the most.

A further object of the invention is to provide such a device wherein the advance mechanism comprises a connecting rod which is displaceable parallel to the filling tube and is coupled to a drive motor and a pushing member engaged with the filling tube and connected over a supporting arm to the connecting rod for pushing the gathered casing.

The advancement of the gathered casing toward the braking ring is then simple and space saving, and, at the same time, the movement can be sensed in a simple way. According to another feature of the invention, the pushing member comprises a ring, in particular a closed ring, which is engaged on the filling tube and coupled or couplable in its working position to the support arm. This ring may either be slotted and thus engageable on the filling tube in the transverse direction, or it may be engaged from the mouth of the filling tube. Thereupon, the gathered casing is slipped on the tube. As far as the ring is not permanently connected to the pushing member, it is coupled thereto after being engaged on the filling tube. For example, by means of the drive motor of the advance mechanism, the supporting arm may be engaged with a stop, particularly a collar.

A still further object of the present invention is to provide a device wherein the drive motor comprises a linear motor in particular a hydraulic or pneumatic working cylinder with a piston connected to the coupling rod.

Such a design saves space and makes the construction rugged and inexpensive. As a rule, compressed air is always available at such machines, so that pneumatic operation is advisable in the first place. It is advantageous to make the piston force adjustable, primarily because of the use in the same machine of various kinds of gathered-up casings.

Another object of the invention is to form the monitoring device with a pulse generator that generates pulses which, if the pulses stop or are spaced apart by an increasing amount, cause the pump to stop its pumping operation.

The electronic drive control is preferably a central control of the entire machine, thus also of all the drives of the machine, which, in the above mentioned kind, includes the drive of the pump, of the filling tube, of the squeezing device, and, if provided, of a device for engaging the casing. Further, it is relatively inexpensive to provide a pulse generator by which the pump is switched off if no pulses are delivered. It is certainly advantageous if in such instances, the squeezing device is switched off simultaneously, and a disturbance signal is given. Preferably, the pulse generator delivers electric pulses directly.

With pulses normally delivered at constant intervals, a switching off may be effected even in response to a non-uniform arrival of pulses at the pulse counter. According to another feature of the invention, motion transmitter means are connected to the pulse generator and are formed of an endless member which is trained around a pair of pulleys or sprocket wheels, the connecting rod being coupled to the endless member. By this last named feature it is understood, of course, that the straight sections of the endless member extend parallel to the connecting rods. Otherwise, the coupling member does not necessarily act directly on the connecting rod, the coupling may be effected also at another location, such as at the junction of the connecting rod and the piston rod, or at the outer end of the piston rod. Preferably, the endless member is an endless chain trained about sprocket wheels.

A further object of the invention is to provide a device for stuffing pasty material, in particular sausage meat into a sausage casing, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only FIGURE of the drawing is a schematic side elevational view, partly in section of the inventive device.

DESCRIPTION OF THE PREFERRED EMBODIMENT

Referring to the drawing in particular, the invention embodied therein comprises a device for stuffing pasty material into a casing which is gathered on a filling tube, and which has a mechanism for sensing when casing is no longer being filled, in particular because of a rupture in the casing.

The machine for stuffing pasty or doughy substances, particularly sausage meat into a casing, comprises filling equipment 1 including a filling funnel 2 and a feed pump 3. In the process taken as example in the following, namely of making sausages, chopped meat, spices, etc. are introduced manually and/or mechanically into funnel 2. After further cutting or even mincing in a mincer 4 of known design, the sausage meat thus produced passes into feed pump 3. This pump is also known in design and is preferably a geared pump having an internally toothed outer gear and a driven, eccentrically mounted and externally toothed inner gear meshing therewith. Directly connected to the outlet of the pump is a filling tube 5 which is mounted for rotation. Filling tube 5 extends through a braking ring 6, and, if provided, through a casing operation, braking ring 6 is also rotatable, at the same speed and in the same direction. The machine part 7 supporting braking ring 6 is displaceable in the direction of arrow 8, so that the free end or mouth of filling tube 5 can be made accessible. If needed, machine part 7 may be made pivotable perpendicularly out of the drawing plane, to further improve the access. The gathered-up casing 10 is then engaged on to the filling tube in the direction of arrow 8. The next step is to again introduce the filling tube 5 into the braking ring 6, and the gathering ring, if present. The "starting" end of the gathered-up casing then slightly protrudes from the mouth 9 of filling tube 5. As soon as the pump starts delivering sausage meat and the casing end is closed the casing starts to be stuffed and the gradually increasing amount of filling pulls the casing to the left, according to the FIGURE, through the gap between filling tube 5 and the braking ring 6. An "endless" sausage is thereby produced, having the length of the now stretched, initially gathered, casing 10. By means of a suitable equipment for forming sausage ends, the continuously stuffed casing is subdivided in steps into individual sausages. Advantageously, this equipment is a squeezing device having rotary pairs of squeezing plates which advance exactly at the same speed as the stuffed casing. Now, if the stuffed casing is squeezed at some predetermined location, only the stuffed casing portion upstream, i.e. remaining between this location and the mouth 9 of the filling tube, can further rotate with the filling tube. Thereby two twisted ends of adjacent sausages are formed. This is all well known in the art so that further details are not here provided.

The squeezing is effected periodically and smoothly; however, since both the stuffing, and end formation are operations which follow each other at a relatively high speed, it may occur that the casing bursts during the twisting, especially if the material is sensitive or even contains defective areas. Without the inventive design, the sausage meat further delivered by the pump would then be spilled.

To prevent such damage, the invention provides a pushing member 12 of an advance mechanism 13 at the rear end 11 of the gathered-up casing 10. Advantageously, this pushing member is designed as a ring having a collar 14. The ring is engaged on filling tube 5 at the rear of the gathered-up casing, i.e. upstream considered in the filling direction. Pushing ring 12 has two functions. First, it has to push the gathered, i.e. not yet stuffed, portion of the casing 10 against the braking ring 6 and keep it in "block" position, ie. in closely folded state. Second, the pushing ring acts as a sensor for the displacement of the gathered-up portion of the casing along filling tube 5, thus of the continuous pulling off of the gathered casing portion from the filling tube. If the casing bursts, this continuous displacement stops, and pushing member 12 also stops, at its instantaneously reached location.

Since pushing member 12 is connected through a supporting arm 15 to a connecting rod 16 of the advance mechanism, and, with the pump running, the connecting rod 16 is displaced by a motor or drive means 17 in the direction of arrow 18, there is no advance movement of connecting rod 16 with pushing member 12 at a standstill. This is because casing 10 is stopped by braking ring 6. The supporting arm 15 may have a forked end for engaging the pushing member 12. In any case, motor 17 is not capable of further compressing the gathered-up casing. The advance movement of connecting rod 16 is thus a criterion for a regular operation and correct stuffing of the pulled-off casing. In other words, a sudden interruption of the advance can be utilized for delivering a disturbance signal and stopping the pump, because such an interruption is directly connected to a bursting of the casing during the run of the pump. Motor 17 is preferably a pneumatic working cylinder. Its piston force, i.e. the pull displacing the connecting rod 16 in the direction of arrow 18, is preferably adjustable.

The monitoring equipment further comprises a rotary pulse generator 20. It is driven by a motion transformer 21 which is coupled through a coupling element 22 to advance mechanism 13, more particularly to connecting rod 16. The transformer transforms the linear motion in the direction of arrow 18 into a rotary motion of pulse generator 20 indicated by arrow 23. Its substantial elements are an endless member 24, particularly an endless chain which is trained around at least two guide pulleys or sprocket wheels 25,26. The length of one section of this endless member equals at least the length of the working stroke of motor 17. Each section of the endless member extends in the direction of the piston axis of motor 17, or of the longitudinal axis of filling tube 5.

As long as pulse generator 20 rotates at a constant speed, it delivers pulses at regular intervals, which are received by a pulse counter 30. In the absence of received pulses, or if the interval between two consecutive pulses changes, particularly increases, the pulse counter opens, through the electric control of the machine, at least the circuit of the pump drive at 3.

While a specific embodiment of the invention has been shown and described in detail to illustrate the application of the principles of the invention, it will be understood that the invention may be embodied otherwise without departing from such principles.

What is claimed is:

1. In a device for stuffing pasty material to a casing which casing is gathered on a filling tube with a pump connected to the filling tube and activatable to pump the pasty material through the tube and out a mouth of the tube which cooperates with a breaking ring for dispensing casing from a front end of the gathered casing on the filling tube, and for holding the gathered casing on the filling tube, the improvement which comprises:
    advancing means engageable with a rear end of the gathered casing on the filling tube,
    drive means connected to said advancing means for continuously urging the gathered casing in a unilateral direction toward the breaking ring at a continuous movement rate for continuous feeding of the entire gathered casing at that rate,
    monitoring means connected to said advancing means for sensing the rate of continuous movement of the rear and of the gathered casing on the filling tube and any slowing of such movement, said monitoring means being connected to the pump for stopping the operation of the pump when said movement of the gathered casing on the filling tube is sensed to have slowed.

2. In a device according to claim 1, wherein said advancing means comprises a connecting rod mounted for displacement parallel to the filling tube, a supporting arm connected to said filling tube and a pushing member engaged at least partly with the filling tube and engageable against the rear end of the gathered casing on the filling tube, said drive means comprising a motor connected to said connecting rod for moving said connecting rod.

3. In a device according to claim 2, wherein said pushing member comprises a closed ring engaged around the filling tube and engageable with said supporting arm.

4. In a device according to claim 2, wherein said motor comprises a linear motor.

5. In a device according to claim 1, wherein said monitoring device comprises a pulse generator engaged with said advancing means for generating pulses with movement of the gathered casing on the filling tube.

6. In a device according to claim 5, wherein said pulse generator includes a rotatable member for rotating to generate pulses, said monitoring means including a motion transformer connected to said advancing means for converting linear motion to a rotary motion.

7. A machine for stuffing pasty substance into a sausage casing comprising:
    a pump for pumping the pasty substance;
    a filling tube connected to said pump for receiving the pasty substance therethrough, said filling tube having an open mouth spaced from said pump, said filling tube adapted to receive gathered casing thereon;
    a braking ring movably mounted into and out of engagement with said mouth of said filling tube for discharging the gathered casing for holding said filling tube and from the gathered casing on said filling tube as pasty substance is pumped out of said mouth into the casing;
    a pushing member slidably mounted on said filling tube into engagement with a rear end of gathered casing on said tube which is spaced away from a front end of the gathered casing which is adjacent said braking ring;
    a connecting rod mounted for movement parallel to an axis of said filling tube and connected to said pushing member;
    drive means connected to said connecting rod for driving said pushing member toward said mouth of said filling tube; and
    monitoring means engaged with said connecting rod for sensing movement of said connecting rod resulting from movement of the gathered casing on said filling tube, said monitoring means connected to said pump for stopping the operation of said pump when a slowing in advance of gathered casing on said filling tube is sensed.

8. A machine according to claim 7, wherein said monitoring means includes a pair of spaced apart pulleys, an endless member trained around said pulleys and coupled to said connecting rod and a rotary pulse generator connected to one of said pulleys for generating pulses with linear movement of said connecting rod.

9. A machine according to claim 8, wherein said drive means comprises a piston and cylinder combination connected to said connecting rod for moving said connecting rod to move said pushing member toward said mouth of said filling tube.

10. A machine according to claim 9, including an arm connected to said connecting rod and extending transverse to said axis of said filling tube, said arm having a forked end engaged with said pushing member, said pushing member comprising a ring engaged around and slidable along said filling tube.

11. In a device for stuffing pasty material into a casing which casing is gathered on a filling tube with a pump connected to the filling tube and activatable to pump the pasty material through the tube and out a mouth of the tube which cooperates with a braking ring for dispensing casing from a front end of the gathered casing on the filling tube, and for holding the gathered casing on the filling tube, the improvement comprising:

advancing means engageable with a rear end of the gathered casing on the filling tube;

drive means connected to said advancing means for urging the gathered casing toward the braking ring;

monitoring means connected to said advancing means for sensing rate of movement of the rear end of the gathered casing on the filling tube, said monitoring means connected to the pump for stopping the operation of the pump when movement of the gathered casing on the filling tube is sensed to have slowed or stopped;

said monitoring means comprising a pulse generator engaged with said advancing means for generating pulses with movement of the gathered casing on the filling tube, said pulse generator including a rotatable member for rotating to generate pulses, and said monitoring means including a motion transformer connected to said advancing means for converting linear motion to a rotary motion, said motion transformer comprising a pair of spaced apart guide pulleys, and an endless member trained around said spaced apart guide pulleys, and said advancing means comprising a connecting rod mounted for movement parallel to the filling tube and coupled to said endless member.

12. In a device according to claim 11, wherein said endless member comprises an endless chain, said pair of guide pulleys comprising a pair of sprocket wheels.

* * * * *